United States Patent
Nakayama (10) Patent No.: US 12,250,575 B2
(45) Date of Patent: Mar. 11, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Hidetomo Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 427 days.

(21) Appl. No.: 17/577,353

(22) Filed: Jan. 17, 2022

(65) Prior Publication Data

US 2023/0091188 A1 Mar. 23, 2023

(30) Foreign Application Priority Data

Sep. 22, 2021 (JP) ................. 2021-154515

(51) Int. Cl.
*H04W 24/08* (2009.01)
*H04W 24/10* (2009.01)
*H04W 28/04* (2009.01)

(52) U.S. Cl.
CPC ........... *H04W 24/08* (2013.01); *H04W 24/10* (2013.01); *H04W 28/04* (2013.01)

(58) Field of Classification Search
CPC ..... H04W 24/08; H04W 24/10; H04W 28/04; H04W 28/22; H04W 84/12
See application file for complete search history.

(56) References Cited

U.S. PATENT DOCUMENTS

| | | | |
|---|---|---|---|
| 8,599,807 B2 | 12/2013 | Inada | |
| 10,645,753 B1* | 5/2020 | Hoffner | H04L 12/1407 |
| 2013/0215735 A1* | 8/2013 | Yasumoto | H04W 24/04 370/216 |
| 2014/0052825 A1* | 2/2014 | Luecke | H04L 67/61 709/219 |
| 2015/0131483 A1* | 5/2015 | Colban | H04W 48/14 370/254 |
| 2019/0014021 A1* | 1/2019 | Huang | H04W 48/18 |

FOREIGN PATENT DOCUMENTS

| | | |
|---|---|---|
| JP | 5069341 | 11/2012 |
| JP | 5939042 | 6/2016 |

* cited by examiner

*Primary Examiner* — Edan Orgad
*Assistant Examiner* — Malick A Sohrab
(74) *Attorney, Agent, or Firm* — JCIPRNET (57) ABSTRACT

An information processing apparatus includes a processor configured to: receive a processing request from a mobile terminal via any of plural wireless access points; accumulate and store an actual reception speed of a processing request from a mobile terminal via a wireless access point and identification information of the wireless access point via which the mobile terminal has transmitted the processing request, associatively in an actual reception speed database; on the basis of the actual reception speed database, calculate a representative actual reception speed which is a representative value of one or more actual reception speeds for each wireless access point; and report the representative actual reception speed of each wireless access point to a user who is about to use a mobile terminal to transmit a processing request to the information processing apparatus via a wireless access point.

8 Claims, 6 Drawing Sheets

60

| JOB NUMBER | IDENTIFICATION INFORMATION OF WIRELESS AP | ACTUAL RECEPTION SPEED [Mbps] | TRANSMISSION FAILURE INFORMATION | MODEL NUMBER |
|---|---|---|---|---|
| 1 | B | 15 | — | P5 |
| 2 | C | 110 | — | i12 |
| 3 | B | 25 | — | G21 |
| 4 | C | 90 | — | i10 |
| 5 | C | 100 | — | i12 |
| 6 | A | 0 | FAILURE | X1 |
| ... | ... | ... | ... | ... |

| JOB NUMBER | IDENTIFICATION INFORMATION OF WIRELESS AP | ACTUAL RECEPTION SPEED [Mbps] | TRANSMISSION FAILURE INFORMATION | MODEL NUMBER |
|---|---|---|---|---|
| 1 | B | 15 | — | P5 |
| 2 | C | 110 | — | i12 |
| 3 | B | 25 | — | G21 |
| 4 | C | 90 | — | i10 |
| 5 | C | 100 | — | i12 |
| 6 | A | 0 | FAILURE | X1 |
| ... | ... | ... | ... | ... |

| IDENTIFICATION INFORMATION OF WIRELESS AP | AVERAGE ACTUAL RECEPTION SPEED [Mbps] | PRIORITY | TOTAL NUMBER OF TRANSMISSION FAILURES |
|---|---|---|---|
| C | 100 | 1 | 0 |
| B | 20 | 2 | 0 |
| A | 0 | 3 | 1 |
| ... | ... | ... | ... |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-154515 filed Sep. 22, 2021.

BACKGROUND

(i) Technical Field

The present disclosure relates to an information processing apparatus, an information processing method, and a non-transitory computer readable medium.

(ii) Related Art

Japanese Patent No. 5069341 discloses a system that includes a wireless terminal and a plurality of wireless access points, and the wireless terminal connects to an external network via wireless access points. A wireless access point that has been wirelessly connected to the wireless terminal determines a wireless access point to take to reach the external network on the basis of the power level of radio waves received from other wireless access points.

Japanese Patent No. 5939042 discloses a system that includes a mobile terminal apparatus and an image processing apparatus, and a processing request may be transmitted from the mobile terminal apparatus to the image processing apparatus via at least one of a short-range wireless communication line and a network communication line. The image processing apparatus determines, out of the short-range wireless communication line and the network communication line, a communication route with which a required transmission completion time of a processing request transmitted by the mobile terminal apparatus is shorter.

By the way, a system is conceivable in which a processing request may be transmitted from a mobile terminal to an information processing apparatus via a wireless access point, and plural wireless access points are provided for the mobile terminal to communicate and connect with. In such a system, these wireless access points may contain a wireless access point via which a processing request from the mobile terminal may not be properly transmitted to the information processing apparatus.

There are various factors for making it difficult to transmit a processing request from the mobile terminal to the information processing apparatus via a wireless access point. One exemplary factor is that, even in the case where the power level of radio waves received by the mobile terminal from a wireless access point is sufficiently high, radio waves from this access point interfere with radio waves from another nearby wireless access point, which may disable transmission of a processing request from the mobile terminal to the information processing apparatus.

SUMMARY

Aspects of non-limiting embodiments of the present disclosure relate to enabling a user to recognize, in the case of transmitting a processing request from a mobile terminal to an information processing apparatus via any of plural wireless access points, a wireless access point via which the processing request may be transmitted from the mobile terminal to the information processing apparatus without any problems.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive a processing request from a mobile terminal via any of a plurality of wireless access points; accumulate and store an actual reception speed of a processing request from a mobile terminal via a wireless access point and identification information of the wireless access point via which the mobile terminal has transmitted the processing request, associatively in an actual reception speed database; on the basis of the actual reception speed database, calculate a representative actual reception speed which is a representative value of one or more actual reception speeds for each wireless access point; and report the representative actual reception speed of each wireless access point to a user who is about to use a mobile terminal to transmit a processing request to the information processing apparatus via a wireless access point.

BRIEF DESCRIPTION OF THE DRAWINGS

An exemplary embodiment of the present disclosure will be described in detail based on the following figures, wherein.

DETAILED DESCRIPTION

Figure 1:
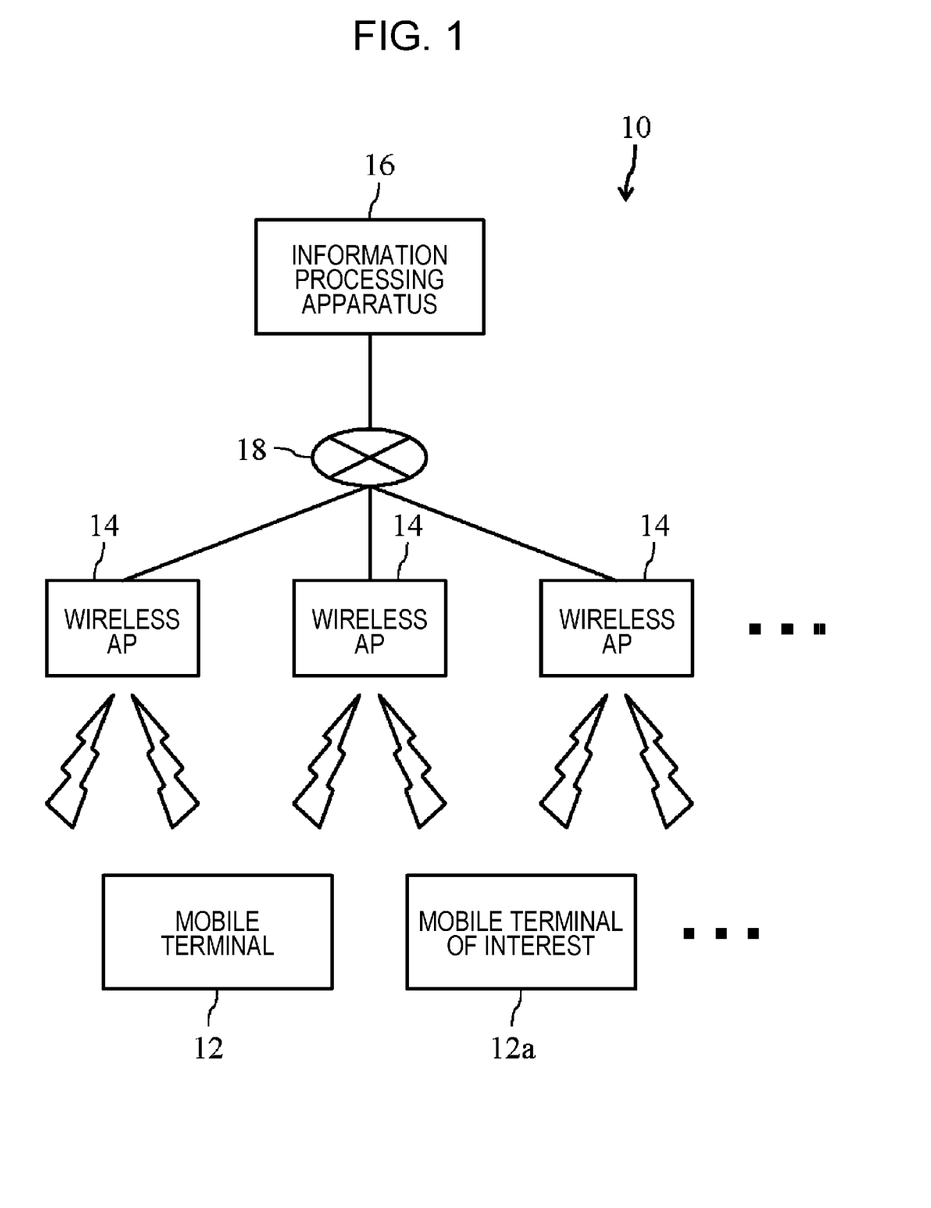
FIG. 1 is a block diagram of an information processing system according to an exemplary embodiment.

FIG. 1 is a block diagram of an information processing system 10 according to an exemplary embodiment. The information processing system 10 includes a plurality of mobile terminals 12 used by a plurality of users, a plurality of wireless access points 14 (hereinafter abbreviated as wireless APs 14), and an information processing apparatus 16. Note that a mobile terminal of interest 12a illustrated in FIG. 1 is one of the mobile terminals 12, and this will be described later.

The mobile terminals 12 and the wireless APs 14 are capable of communicating and connecting with each other through wireless communication via a wireless local area network (LAN) or a mobile phone network. In addition, the wireless APs 14 and the information processing apparatus 16 are communicatively connected to each other via a network 18, which includes communication lines of a LAN. The network 18 may be a wireless LAN that performs Ethernet (registered trademark) communication, or may include wireless communication via a wireless LAN using a wireless router. Accordingly, the mobile terminals 12 are each capable of communicating and connecting with the information processing apparatus 16 via any of the wireless APs 14.

In the information processing system 10, a user communicates and connects with the information processing apparatus 16 from a mobile terminal 12 via any of the wireless APs 14, and transmits, from the mobile terminal 12 to the information processing apparatus 16, a job serving as a processing request for causing the information processing apparatus 16 to execute processing. Here, the wireless APs 14 may contain a wireless AP 14 via which a job from a mobile terminal 12 may not be properly transmitted to the information processing apparatus 16. The fact that "a job may not be properly transmitted" means that a job may not be transmitted from a mobile terminal 12 to the information processing apparatus 16, or, even if a job is transmitted, it takes a long time until the transmission is completed.

For example, the user may allow a mobile terminal 12 to communicate and connect with a wireless AP 14 from which radio waves received by the mobile terminal 12 are of a higher power level than other wireless APs 14. However, even in the case where a mobile terminal 12 communicates and connects with a wireless AP 14 whose radio waves are of a sufficiently high power level, radio waves from another wireless AP 14 near the foregoing wireless AP 14 interfere, thereby destabilizing or cutting wireless communication between the mobile terminal 12 and the foregoing wireless AP 14. If the wireless communication becomes unstable, a job may be transmitted, but it takes a long time to finish transmitting the job. If the wireless communication is cut off in the middle of transmission of a job, needless to say, it becomes unable to transmit the job to the information processing apparatus 16 (resulting in a failure of the job transmission).

Alternatively, the user is able to select a wireless AP 14 with which a mobile terminal 12 communicates and connects, on the basis of the communication speed of each wireless AP 14 according to specifications. The communication speed of each wireless AP 14 according to specifications is indicated by, for example, a wireless communication standard (such as Wi-Fi (registered trademark) 5 and Wi-Fi 6 of the wireless LAN standards, or 4G and 5G of the mobile telecommunications standards) supported by each wireless AP 14. For example, if the mobile terminal 12 supports Wi-Fi 6, it is expected that a job is transmitted at a higher speed by selecting a wireless AP 14 that supports Wi-Fi 6, instead of a wireless AP 14 that does not support Wi-Fi 6 but supports up to Wi-Fi 5. However, even in the case where the mobile terminal 12 communicates and connects with a wireless AP 14 with a higher communication speed according to specifications, because of the above-mentioned radio interference, wireless communication is not always performed at the expected communication speed according to specifications. In addition, for example, depending on the connection state of the network 18 between the wireless AP 14 and the information processing apparatus 16, such as when there is a router that may be a bottleneck in terms of communication speed in the middle of a communication route between the wireless AP 14 and the information processing apparatus 16, the actual communication speed of communication between the mobile terminal 12 and the information processing apparatus 16 may sometimes be slower than the expected communication speed according to the specifications of the wireless AP 14.

Therefore, in the case of transmitting a job from a mobile terminal 12 to the information processing apparatus 16 via a wireless AP 14, it is desired that the mobile terminal 12 communicate and connect with an appropriate wireless AP 14 among the wireless APs 14. An appropriate wireless AP 14 is a wireless AP 14 via which a job may be transmitted at a higher speed from a mobile terminal 12 to the information processing apparatus 16 than that in the case where a job is transmitted via other wireless APs 14. Ideally, an appropriate wireless AP 14 is a wireless AP 14 via which a job may be transmitted from the mobile terminal 12 to the information processing apparatus 16 at the highest speed among the wireless APs 14. The information processing system 10 supports the user to be able to transmit a job from a mobile terminal 12 to the information processing apparatus 16 via an appropriate wireless AP 14.

The information processing system 10 according to the exemplary embodiment is installed in an office, and the information processing apparatus 16 is an image forming apparatus that performs printing on receipt of a print job from a user. The image forming apparatus is capable of receiving a print job from the user via the network 18. In addition, the wireless APs 14 connected to the network 18 are installed in the office. The user transmits a print job from a mobile terminal 12 to the information processing apparatus 16 via a wireless AP 14 selected from among the wireless APs 14. Note that the mode of the information processing system 10 is not limited to the above.

Figure 2:
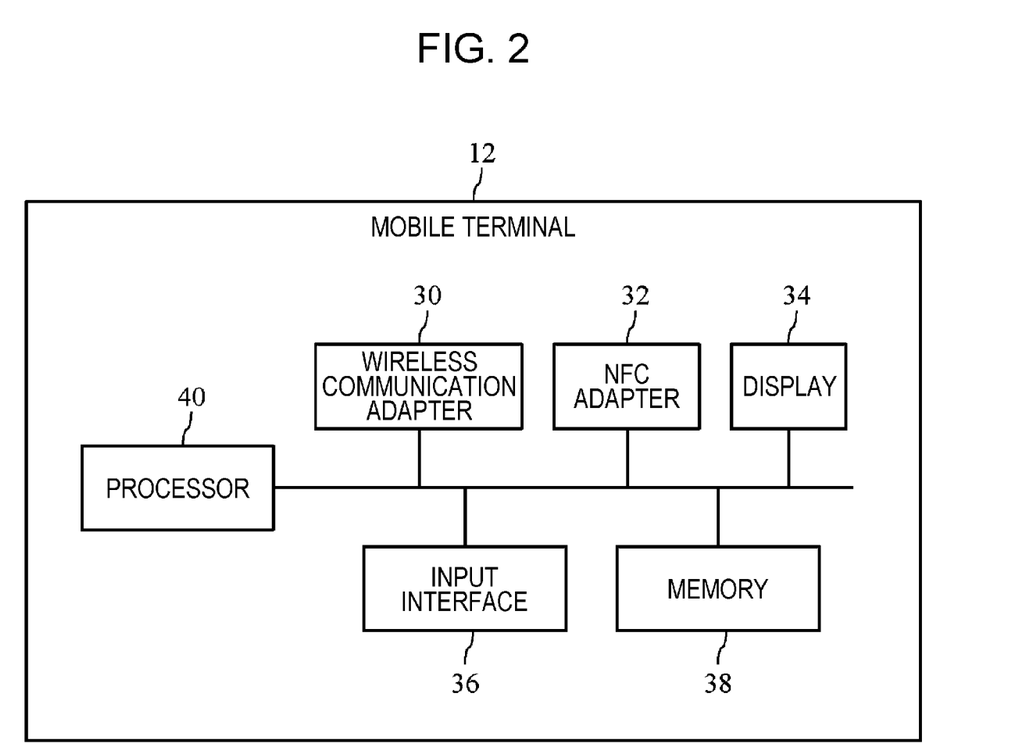
FIG. 2 is a block diagram of a mobile terminal.

FIG. 2 is a block diagram of a mobile terminal 12. Since the mobile terminal of interest 12a is one of the mobile terminals 12 as mentioned above, the mobile terminal of interest 12a also has a configuration equivalent to that of the mobile terminal 12 described hereinafter. The mobile terminal 12 is a smartphone, a tablet terminal, or the like. The mobile terminal 12 may be any terminal as long as it is carriable and usable by a user, it is capable of communicating and connecting with the information processing apparatus 16 via a wireless AP 14, and it is capable of transmitting a job to the information processing apparatus 16.

A wireless communication adapter 30 is a communication adapter for performing wireless communication with a wireless AP 14 via a wireless LAN or a mobile phone network. In the case of performing wireless communication with a wireless AP 14 via a mobile phone network, the user makes a contract with any of communication carriers (that is, telecommunications carriers) in advance, and wireless communication is performed with a wireless AP 14 via a mobile phone network provided by the contracted communication carrier. Even if there are multiple communication carriers, the wireless communication adapter 30 is unable to perform wireless communication with a wireless AP 14 using a mobile phone network provided by a communication carrier with which the user has made no contract.

A near-field communication (NFC) adapter 32 is a communication adapter for performing short-range wireless communication with another apparatus (particularly the information processing apparatus 16) near the mobile terminal 12. In the present specification, short-range wireless communication means the so-called NFC, which means short-range wireless communication in a narrow sense. That is, short-range wireless communication in the present specification includes NFC protocols such as Bluetooth (registered trademark), ZigBee (registered trademark), and Felica (registered trademark), but includes no wireless LANS.

Short-range wireless communication is characterized in that its communication speed is slower than that of LAN communication or of mobile phone communication using a mobile phone network. Therefore, short-range wireless communication is not suitable for transmitting large amounts of data. In the case of wirelessly transmitting large amounts of data, communication through a wireless LAN or mobile phone communication is used. For example, because of its large amount, a print job is transmitted to the information processing apparatus 16 using communication through a wireless LAN or mobile phone communication, instead of using short-range wireless communication.

A display 34 includes, for example, a liquid crystal panel. A screen including various types of information is displayed on the display 34.

An input interface 36 includes, for example, a touchscreen and buttons. The input interface 36 receives instructions from the user.

A memory 38 includes, for example, embedded Multi Media Card (eMMC), read-only memory (ROM), and random-access memory (RAM). The memory 38 stores a mobile terminal program for causing the units of the mobile terminal 12 to operate.

A processor 40 refers to a processor in a broad sense, and includes at least one of general processors (such as a central processing unit (CPU)) and dedicated processors (such as a graphics processing unit (GPU), an application specific integrated circuit (ASIC), a field-programmable gate array (FPGA), and a programmable logic device). The processor 40 is not limited to one processor and may be configured by plural processors in collaboration which are located physically apart from each other but may work cooperatively. The processor 40 controls the units of the mobile terminal 12 in accordance with the mobile terminal program stored in the memory 38.

Figure 3:
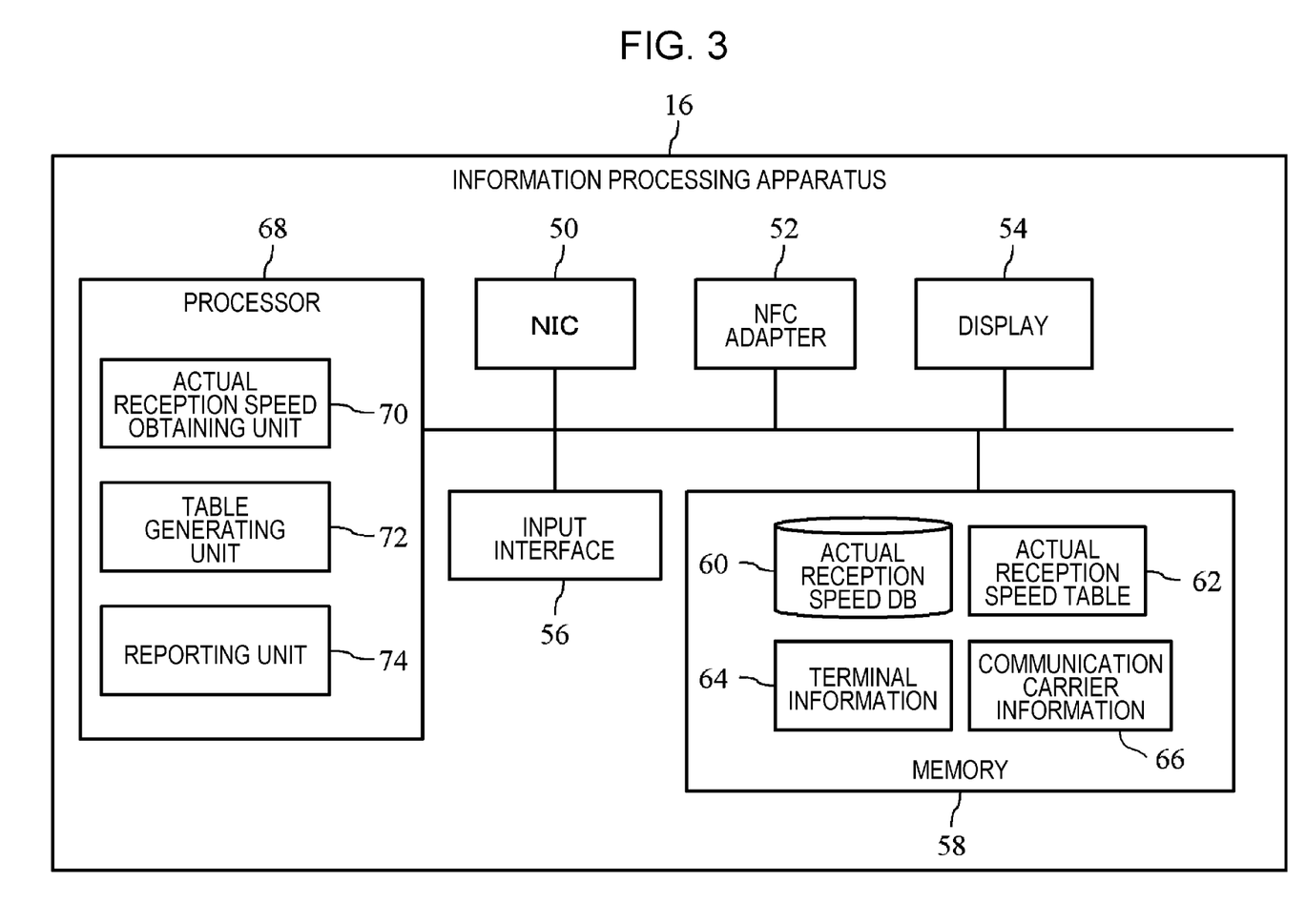
FIG. 3 is a block diagram of an information processing apparatus according to the exemplary embodiment.

FIG. 3 is a block diagram of the information processing apparatus 16. As mentioned above, the information processing apparatus 16 is an image forming apparatus that performs printing on the basis of a print job from a user in the exemplary embodiment. However, the information processing apparatus 16 is not limited to the above, and may be any apparatus as long as it is capable of communicating and connecting with a mobile terminal 12 used by the user via a wireless AP 14, and it is capable of receiving a job from the mobile terminal 12 via the wireless AP 14.

A network interface card (NIC) 50 is a communication adapter for connecting to the network 18 such as a LAN. The NIC 50 is communicatively connected to the wireless APs 14 via the network 18, and performs the function of communicating and connecting with a mobile terminals 12 via the wireless APs 14.

An NFC adapter 52 is a communication adapter for performing short-range wireless communication with another apparatus (particularly a mobile terminal 12) near the information processing apparatus 16.

A display 54 includes, for example, a liquid crystal panel. A screen including various types of information is displayed on the display 54.

An input interface 56 includes, for example, a touchscreen and buttons. The input interface 56 receives instructions from the user.

A memory 58 includes, for example, a hard disk drive (HDD), solid state drive (SSD), eMMC, ROM, and RAM. The memory 58 stores an information processing program for causing the units of the information processing apparatus 16 to operate. In addition, the memory 58 also stores an actual reception speed database (DB) 60 and an actual reception speed table 62. The actual reception speed DB 60 is generated or updated by an actual reception speed obtaining unit 70 described later. The details of the actual reception speed DB 60 will be described later along with processing of the actual reception speed obtaining unit 70. In addition, the actual reception speed table 62 is generated by a table generating unit 72 described later. The details of the actual reception speed table 62 will be described later along with processing of the table generating unit 72.

In addition, the memory 58 stores terminal information 64. The terminal information 64 is information indicating the communication performance of each model number (that is, model) of the mobile terminals 12 usable by users. Information indicating the communication performance of the model number of each of the mobile terminals 12 may be information indicating a communication standard supported by the model number. Exemplary communication standards include Wi-Fi 5, Wi-Fi 6, 4G, and 5G. These items of information may be obtained from the website of the manufacturer of each mobile terminal 12. The terminal information 64 is generated in advance by the administrator of the information processing system 10, for example, and is stored in the memory 58.

The memory 58 further stores communication carrier information 66. The wireless APs 14 included in the information processing system 10 may contain a wireless AP 14 that wirelessly communicates with a mobile terminal 12 through mobile phone communication using a mobile phone network provided by a communication carrier. The communication carrier information 66 is information indicating such a communication carrier that provides mobile phone communication for each wireless AP 14. Needless to say, the wireless APs 14 may contain a wireless AP 14 that performs wireless communication with a mobile terminal 12 using only a wireless LAN, and the communication carrier information 66 need not include information regarding such a wireless AP 14. The communication carrier information 66 is generated in advance by the administrator of the information processing system 10, for example, and is and stored in the memory 58.

A processor 68 refers to a processor in a broad sense, and includes at least one of general processors (such as a CPU) and dedicated processors (such as a GPU, ASIC, FPGA, and programmable logic device). The processor 68 is not limited to one processor and may be configured by plural processors in collaboration which are located physically apart from each other but may work cooperatively. As illustrated in FIG. 3, the processor 68 performs functions as the actual reception speed obtaining unit 70, the table generating unit 72, and a reporting unit 74 in accordance with the information processing program stored in the memory 58.

On receipt of communication connection from a mobile terminal 12 via a wireless AP 14, the actual reception speed obtaining unit 70 first obtains the identification information of the wireless AP 14. The identification information of the wireless AP 14 includes, for example, the service set identifier (SSID). However, the identification information of the wireless AP 14 may be any information as long as it is capable of uniquely identifying the wireless AP 14. By executing a command (such as a tracert command) for displaying a list of network routes to the mobile terminal 12, the actual reception speed obtaining unit 70 may obtain the identification information of the wireless AP 14. In addition, the actual reception speed obtaining unit 70 may obtain the identification information of the wireless AP 14 from the mobile terminal 12 through communication using the NIC 50 or short-range wireless communication using the NFC adapter 52.

Next, when the actual reception speed obtaining unit 70 receives a job from the mobile terminal 12 via a wireless AP 14, the actual reception speed obtaining unit 70 obtains the actual reception speed, which is not the reception speed according to specifications but is the actual reception speed, of the job. Specifically, the actual reception speed obtaining unit 70 obtains a reception start time at which reception of a job from the mobile terminal 12 via a wireless AP 14 started and a reception completion time at which the job reception is completed, and obtains the difference between the reception completion time and the reception start time as a reception time. Next, the actual reception speed obtaining unit 70 divides the data amount of the job by the obtained reception time to calculate the actual reception speed of the job. Note that information indicating the data amount of the job is included in attribute information of the job, which is received along with the job. The actual reception speed obtaining unit 70 refers to the attribute information, thereby obtaining the data amount of the job.

The actual reception speed obtaining unit 70 associatively stores the actual reception speed of a job from the mobile terminal 12 and the identification information of a wireless AP 14 via which the mobile terminal 12 has transmitted the job in the actual reception speed DB 60. In the exemplary embodiment, information including a set of the actual reception speed of the job and the identification information of the wireless AP 14, which are stored in the actual reception speed DB 60, is called job reception data. As will be described later, job reception data may include various types of information. However, items of information included in a single item of job reception data are stored associatively in the actual reception speed DB 60. Whenever the information processing apparatus 16 receives a job from a mobile terminal 12 via a wireless AP 14, the actual reception speed obtaining unit 70 stores job reception data in the actual reception speed DB 60. Accordingly, items of job reception data are accumulated in the actual reception speed DB 60.

Figure 4:
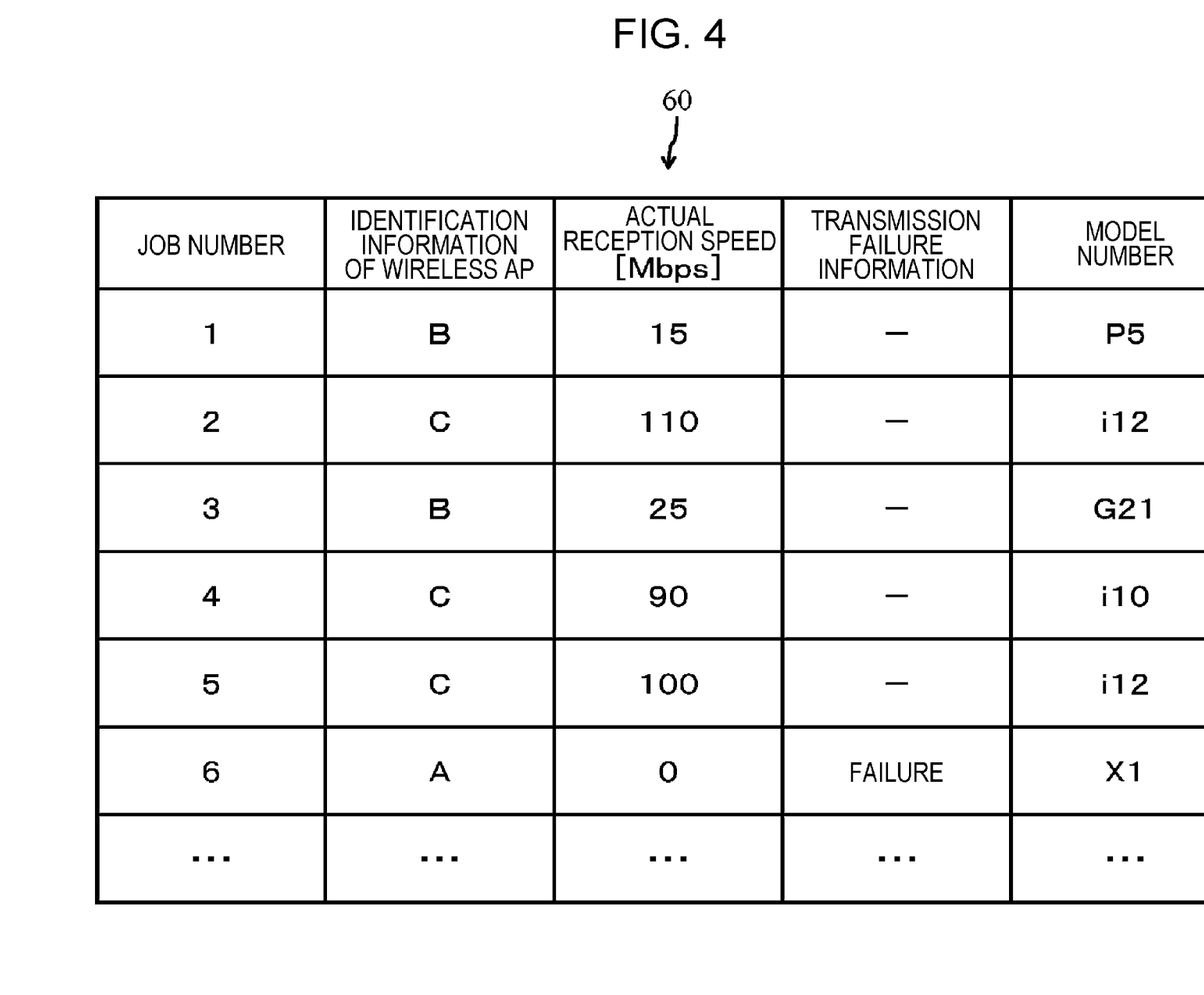
FIG. 4 is a diagram illustrating exemplary content of an actual reception speed database (DB)

FIG. 4 is a diagram illustrating exemplary content of the actual reception speed DB 60. In FIG. 4, the actual reception speed DB 60 is illustrated in the format of a table, and one record in the table indicates a single item of job reception data. Although the identification information of each wireless AP 14 is briefly indicated as, for example, "B" or "C" in the example illustrated in FIG. 4, the identification information of each wireless AP 14 may be, for example, the SSID, as mentioned above.

In the exemplary embodiment, job reception data includes a job number. The job number is identification information for uniquely identifying a job, and is given by the actual reception speed obtaining unit 70 when job reception data is stored in the actual reception speed DB 60.

The job reception data may further include transmission failure information indicating that transmission of the job from a mobile terminal 12 to the information processing apparatus 16 via a wireless AP 14 failed. In the example illustrated in FIG. 4, job reception data including the job number "6" and the identification information "A" of a wireless AP 14 includes the transmission failure information "failure". This means that, when a mobile terminal 12 attempted to transmit a job with the job number "6" to the information processing apparatus 16 via a wireless AP 14 indicated by the identification information "A", the job could not be actually transmitted.

In the case where transmission of a job from a mobile terminal 12 to the information processing apparatus 16 via a wireless AP 14 failed, it means that the information processing apparatus 16 and the mobile terminal 12 are unable to communicate with each other through communication using the NIC 50. Therefore, the information processing apparatus 16 obtains, through short-range wireless communication using the NFC adapter 52, the identification information of the wireless AP 14 via which the job was attempted to be transmitted from the mobile terminal 12, and transmission failure information indicating that the transmission of the job failed. On the basis of these items of information, the actual reception speed obtaining unit 70 stores job reception data including the transmission failure information in the actual reception speed DB 60. In this case, the actual reception speed of the job reception data may be "0 [Mbps]". In the example illustrated in FIG. 4, items of job reception data with the job numbers "1" to "5" include no transmission failure information. This means that transmission of jobs with the job numbers "1" to "5" from respective mobile terminals 12 to the information processing apparatus 16 via respective wireless APs 14 was successful.

The job reception data may further include the model number of the mobile terminal 12 that has transmitted the job. The model number of the mobile terminal 12 that has transmitted the job to the information processing apparatus 16 is included in attribute information of the job, and the actual reception speed obtaining unit 70 may obtain the model number of the mobile terminal 12 by referring to the attribute information of the job. If the transmission of the job fails, the actual reception speed obtaining unit 70 receives the model number of the mobile terminal 12 that attempted to transmit the job, along with the identification information of the above-mentioned wireless AP 14 and transmission failure information, from the mobile terminal 12 through short-range wireless communication with the mobile terminal 12.

Referring back to FIG. 3, the table generating unit 72 calculates the representative actual reception speed which is the representative value of one or more actual reception speeds for each wireless AP 14 on the basis of the actual reception speed DB 60. After that, the table generating unit 72 generates the actual reception speed table 62 where the identification information of the wireless AP 14 and the calculated representative actual reception speed are associated with each other. In the exemplary embodiment, the table generating unit 72 calculates the average of plural actual reception speeds for each wireless AP 14 as the representative value, and sets the average actual reception speed as the representative actual reception speed. Note that the representative value is not limited to the average, and may be, for example, the median or mode of plural actual reception speeds of each wireless AP 14.

Specifically, for example, the table generating unit 72 first extracts plural items of job reception data including the identification information of the same wireless AP 14 from the actual reception speed DB 60. Next, the table generating unit 72 calculates the average of plural actual reception speeds included in the extracted items of job reception data. The table generating unit 72 associates the identification information of the wireless AP 14 and the calculated average actual reception speed. For each wireless AP 14 included in the actual reception speed DB 60, the table generating unit 72 repeats the above processing and, as a result, generates the actual reception speed table 62.

Figure 5:
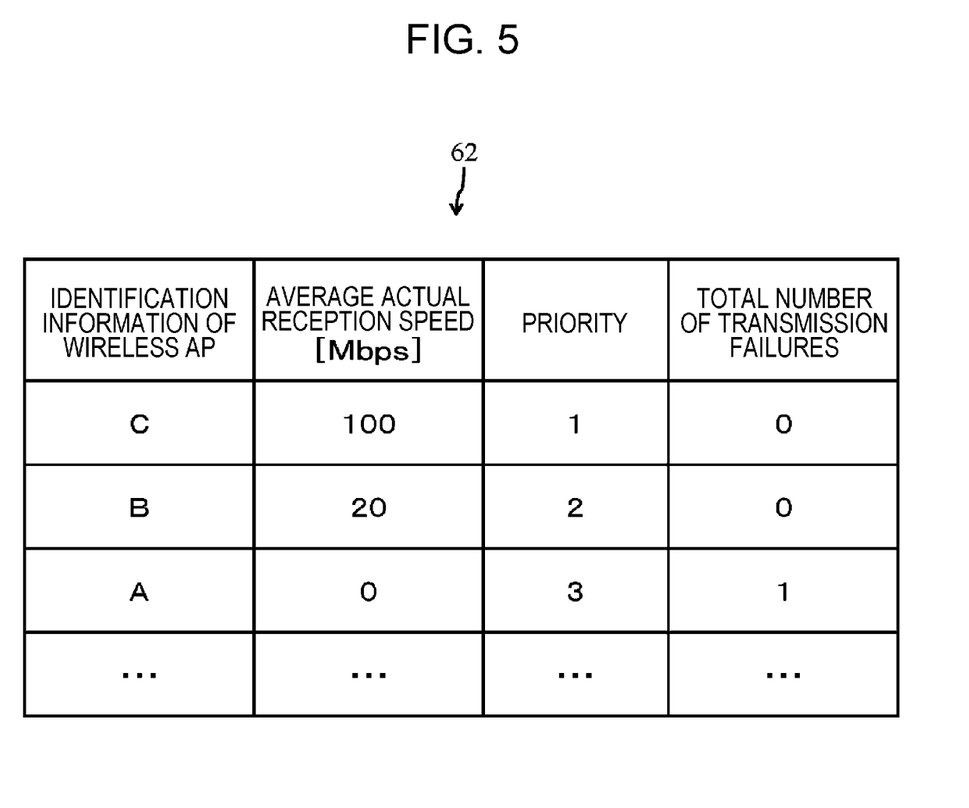
FIG. 5 is a diagram illustrating exemplary content of an actual reception speed table.

FIG. 5 is a diagram illustrating exemplary content of the actual reception speed table 62. In the actual reception speed table 62, the average actual reception speed of each wireless AP 14 included in the actual reception speed DB 60 is indicated. The average actual reception speed is, unlike the reception speed (communication speed) according to specifications, as its name suggests, the average of actual reception speeds in the past. Therefore, the average actual reception speed of each wireless AP 14 indicated in the actual reception speed table 62 indicates the substantial reception speed when transmitting a job from a mobile terminal 12 to the information processing apparatus 16 via each wireless AP 14.

When a user uses various mobile terminals 12 to communicate and connect with the information processing apparatus 16 via respective wireless APs 14, each of the mobile terminals 12 may have different communication performance depending on its model number (that is, model). For example, assuming communication connection with a wireless AP 14 supporting Wi-Fi 6, a mobile terminal 12 of a model that supports Wi-Fi 6 is capable of performing wireless communication according to the Wi-Fi 6 standard; however, a mobile terminal 12 of a model that does not support Wi-Fi 6 but supports only up to Wi-Fi 5 performs wireless communication according to the Wi-Fi 5 standard, which has a slower communication speed than Wi-Fi 6. That is, the model number of a mobile terminal 12 may affect the actual reception speed.

Therefore, the table generating unit 72 may calculate the representative actual reception speed by taking into consideration the communication performance of a mobile terminal 12 associated with each actual reception speed stored in the actual reception speed DB 60. On the basis of the terminal information 64, the table generating unit 72 may obtain the communication performance of each model number of the mobile terminals 12.

For example, the table generating unit 72 refers to the terminal information 64, and classifies the model number of each mobile terminal 12 into one of categories according to its communication performance. The categories include, for example, model numbers supporting Wi-Fi 6, model numbers supporting up to Wi-Fi 5, model numbers supporting 5G, and model numbers supporting up to 4G. After extracting items of job reception data including the identification information of the same wireless AP 14 from the actual reception speed DB 60, the table generating unit 72 further classifies the extracted items of job reception data into respective categories on the basis of the model numbers included in the extracted items of job reception data. The table generating unit 72 calculates the average actual reception speed for each wireless AP 14 and for each category, and generates the actual reception speed table 62. For example, in the case where the actual reception speed DB 60 has the content illustrated in FIG. 4, the table generating unit 72 extracts three items of job reception data where the identification information of a wireless AP 14 is "C". In the case where the model number "i12" supports Wi-Fi 6 and the model number "i10" supports up to Wi-Fi 5, the table generating unit 72 calculates the average of actual reception speeds of job reception data including the identification information "C" of the wireless AP 14 and the model number "i12", and separately calculates the average of actual reception speeds of job reception data including the identification information "C" of the wireless AP 14 and the model number "i10". In this case, in the actual reception speed table 62, plural average actual reception speeds corresponding to plural categories (a category supporting Wi-Fi 6 and a category supporting up to Wi-Fi 5 in the above example) may be associated with the identification information of one wireless AP 14.

In addition, in the case where the actual reception speed DB 60 includes job reception data including the model number of a mobile terminal 12 whose communication performance is significantly inferior to other mobile terminals 12, the actual reception speed indicated by this job reception data may sometimes be a low speed because the communication performance of this mobile terminal 12 is a bottleneck. Therefore, the table generating unit 72 may refer to the terminal information 64, exclude job reception data including the model number of a mobile terminal 12 whose communication performance is less than or equal to a certain speed, and calculate the average actual reception speed of each wireless AP 14.

In the actual reception speed table 62, it is preferable that a priority be associated with the identification information of each wireless AP 14. The priority is the ranking of recommended wireless APs 14 recommended to go through when transmitting a job from a mobile terminal 12 to the information processing apparatus 16, and is given by the table generating unit 72 in descending order of the average actual reception speed. In addition, when the actual reception speed table 62 is reported to the user later, it is preferable that the table generating unit 72 sort items of identification information of wireless APs 14 in descending order of priority in the actual reception speed table 62 so that the user may easily recognize a wireless AP 14 with high priority.

In the actual reception speed table 62, it is preferable that the total number of job transmission failures be associated with the identification information of each wireless AP 14. Specifically, the table generating unit 72 extracts plural items of job reception data including the identification information of the same wireless AP 14 from the actual reception speed DB 60, calculates the average of actual reception speeds, and calculates the number of items of job reception data given transmission failure information (that is, the total number of transmission failures) out of the extracted items of job reception data. In the actual reception speed table 62, the calculated total number of transmission failures is associated with the identification information of the wireless AP 14.

Referring back to FIG. 3, the reporting unit 74 reports the average actual reception speed of each wireless AP 14 to a user who is about to use a mobile terminal 12 to transmit a job to the information processing apparatus 16 via a wireless AP 14. In the present specification, a mobile terminal 12 used by a user who is about to transmit a job to the information processing apparatus 16 via a wireless AP 14 will be called the mobile terminal of interest 12a.

Since the average actual reception speed of each wireless AP 14 is indicated in the actual reception speed table 62, in the exemplary embodiment, the reporting unit 74 reports the actual reception speed table 62 to the user. In the exemplary embodiment, the reporting unit 74 transmits the actual reception speed table 62 to the mobile terminal of interest 12a before the user transmits a job from the mobile terminal of interest 12a to the information processing apparatus 16 via a wireless AP 14.

For example, the reporting unit 74 transmits the actual reception speed table 62 to the mobile terminal of interest 12a through short-range wireless communication between the mobile terminal of interest 12a and the information processing apparatus 16. For example, before transmitting a job from the mobile terminal of interest 12a to the information processing apparatus 16, the user may sometimes transmit user information from the mobile terminal of interest 12a to the information processing apparatus 16 through short-range wireless communication between the mobile terminal of interest 12a and the information processing apparatus 16, and, as a result, the information processing apparatus 16 may authenticate the user. In the case where this short-range wireless communication is performed, the reporting unit 74 is able to transmit the actual reception speed table 62 to the mobile terminal of interest 12a.

In addition, the reporting unit 74 is also capable of transmitting the actual reception speed table 62 to the mobile terminal of interest 12a through communication with the information processing apparatus 16 using the NIC 50. In this case, before transmitting a job from the mobile terminal of interest 12a to the information processing apparatus 16, the user establishes communication connection with the information processing apparatus 16 from the mobile terminal of interest 12a via a randomly-selected wireless AP 14. Accordingly, the reporting unit 74 is able to transmit the actual reception speed table 62 to the mobile terminal of interest 12a through communication via the wireless AP 14. In this case, communication via the wireless AP 14 may sometimes not have a sufficient communication speed for transmitting a job. However, because the data amount of the actual reception speed table 62 is much smaller than a job, even in such a case, the reporting unit 74 is able to suitably transmit the actual reception speed table 62 to the mobile terminal of interest 12a.

Note that the reporting unit 74 may report the average actual reception speed of each wireless AP 14 to the user using a method other than transmitting the actual reception speed table 62 to the mobile terminal of interest 12a. For example, the average actual reception speed of each wireless AP 14 may be reported to the user by displaying the actual reception speed table 62 on the display 54 of the information processing apparatus 16.

On the basis of the reported average actual reception speed of each wireless AP 14, the user is able to recognize a wireless AP 14 via which a job may be transmitted from the mobile terminal of interest 12a to the information processing apparatus 16 without any problems. For example, the user is able to transmit a job from the mobile terminal of interest 12a to the information processing apparatus 16 via a wireless AP 14 with the highest average actual reception speed among the plural wireless APs 14.

As described above, in the actual reception speed table 62, the total number of transmission failures may be associated with the identification information of the wireless AP 14 in the actual reception speed table 62. In that case, the reporting unit 74 may report the actual reception speed table 62 to the user, thereby reporting the user the total number of job transmission failures regarding each wireless AP 14.

On the basis of not only the average actual reception speed of each wireless AP 14, but also the reported total number of transmission failures of each wireless AP 14, the user is able to select a wireless AP 14 via which a job is transmitted from the mobile terminal of interest 12a to the information processing apparatus 16. For example, a wireless AP 14 with a high average actual reception speed but also with a large total number of transmission failures means a wireless AP 14 that has a high average actual reception speed but that is unstable in terms of communication. In such a case, in the case of transmitting data with a small data amount, it is highly likely that the data will be entirely transmitted at high speed since the data only requires a short transmission time and thus is not susceptible to unstable communication. However, in the case of transmitting data with a large data amount, the data is susceptible to unstable communication, and, as a result, it often takes time to complete the transmission of the data. Therefore, if a to-be-transmitted job has a small data amount, the user may select a wireless AP 14 with a high average actual reception speed and a large total number of transmission failures, and, in the case where a to-be-transmitted job has a large data amount, the user may not select such a wireless AP 14.

Before transmitting a job from the mobile terminal of interest 12a to the information processing apparatus 16, if communication connection is established between the mobile terminal of interest 12a and the information processing apparatus 16 through communication using the NIC 50 or short-range wireless communication, the reporting unit 74 may sometimes be able to obtain the model number of the mobile terminal of interest 12a from the mobile terminal of interest 12a. In that case, the reporting unit 74 may report the user the average actual reception speed of actual reception speeds associated with the model number of the mobile terminal of interest 12a in the actual reception speed DB 60. Accordingly, the user is able to recognize the average actual reception speed of each wireless AP 14 in accordance with the communication performance of the mobile terminal of interest 12a.

For example, the reporting unit 74 may extract items of job reception data including the same model number as the mobile terminal of interest 12a from the actual reception speed DB 60, calculate the average of actual reception speeds of the extracted items of job reception data, and report the calculated average actual reception speed to the user.

Alternatively, the reporting unit 74 may report the user the average actual reception speed of actual reception speeds associated with the model number of a mobile terminal 12 whose communication performance is equivalent to the mobile terminal of interest 12a in the actual reception speed DB 60 (such as a mobile terminal 12 belonging to the same category as the mobile terminal of interest 12a in categories regarding the above-mentioned communication performance).

For example, the reporting unit 74 may refer to the terminal information 64, extract items of job reception data including the model number of a mobile terminal 12 belonging to the same category as the mobile terminal of interest 12a from the actual reception speed DB 60, calculate the average of actual reception speeds of the extracted items of job reception data, and report the calculated average actual reception speed to the user.

Alternatively, as mentioned above, in the case where the table generating unit 72 calculates the average actual reception speed for each wireless AP 14 and for each category regarding the communication performance of the mobile terminals 12, and generates the actual reception speed table 62 in which the average actual reception speed is associated with each wireless AP 14 and with each category, the reporting unit 74 may refer to the terminal information 64, identify a category including the mobile terminal of interest 12a, extract a record for the category of the mobile terminal of interest 12a from the actual reception speed table 62, and report the extracted record to the user.

Before transmitting a job from the mobile terminal of interest 12a to the information processing apparatus 16, if communication connection is established between the mobile terminal of interest 12a and the information processing apparatus 16 through communication using the NIC 50 or short-range wireless communication, and the mobile terminal of interest 12a performs wireless communication through mobile phone communication instead of a wireless LAN, the reporting unit 74 may sometimes be able to obtain, from the mobile terminal of interest 12a, a communication carrier used by the mobile terminal of interest 12a to perform mobile phone communication. In that case, the reporting unit 74 may report the user the average actual reception speed of a wireless AP 14 capable of performing mobile phone communication using the same communication carrier as the communication carrier used by the mobile terminal of interest 12a for performing mobile phone communication. Accordingly, the user is able recognize the average actual reception speed of each wireless AP 14 with which the mobile terminal of interest 12a is able to communicate and connect through mobile phone communication.

For example, the reporting unit 74 refers to the communication carrier information 66, extracts from the actual reception speed table 62 a record for a wireless AP 14 capable of performing mobile phone communication using the same communication carrier as the communication carrier of the mobile terminal of interest 12a, and report the record to the user. For example, in the case where the actual reception speed table 62 has the content illustrated in FIG. 5, and the mobile terminal of interest 12a is capable of performing mobile phone communication using a communication carrier S, a wireless AP 14 indicated by the identification information "A" is capable of performing mobile phone communication using the communication carrier S, a wireless AP 14 indicated by the identification information "B" is incapable of performing mobile phone communication using the communication carrier S, and a wireless AP 14 indicated by the identification information "C" is capable of performing mobile phone communication using the communication carrier S, the reporting unit 74 reports the user the actual reception speed table 62 from which a record for the wireless AP 14 indicted by the identification information "B" has been deleted.

The outline of the configuration of the information processing system 10 according to the exemplary embodiment is as described above. Hereinafter, the flow of a process of the information processing apparatus 16 will be described in accordance with the flowchart illustrated in FIG. 6.

Figure 6:
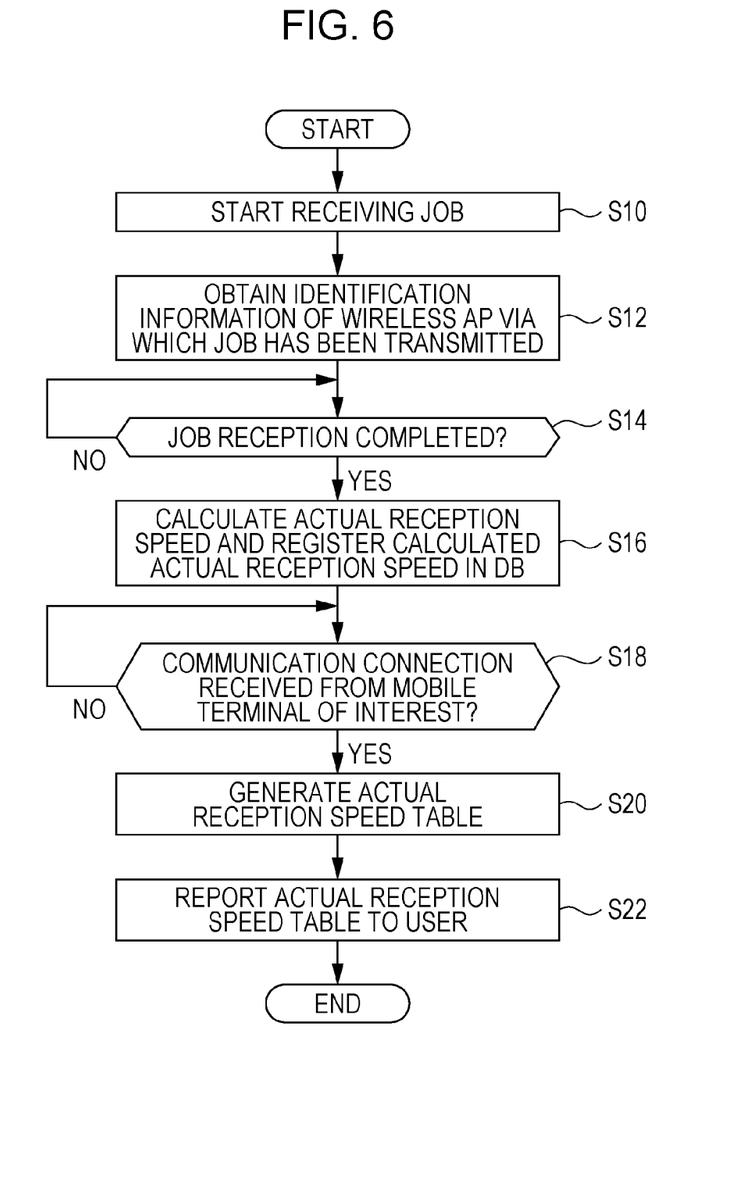
FIG. 6 is a flowchart illustrating the flow of a process of the information processing apparatus.

In step S10, a mobile terminal 12 starts transmitting a job to the information processing apparatus 16 via any of the wireless APs 14, and the information processing apparatus 16 starts receiving the job. At this time, the actual reception speed obtaining unit 70 obtains the job reception start time.

In step S12, the actual reception speed obtaining unit 70 obtains the identification information of a wireless AP 14 via which the mobile terminal 12 has transmitted the job.

In step S14, the actual reception speed obtaining unit 70 waits until reception of the job is completed, and, when reception of the job is completed, the process proceeds to step S16.

In step S16, the actual reception speed obtaining unit 70 obtains the job reception completion time, and calculates a reception time, which is the difference between the reception start time obtained in step S10 and the reception completion time. The actual reception speed obtaining unit 70 divides the data amount of the job by the reception time to calculate the actual reception speed. After that, the actual reception speed obtaining unit 70 stores, in the actual reception speed DB 60, job reception data in which the identification information of the wireless AP 14 obtained in step S12 and the calculated actual reception speed are associated with each other.

The processor 68 of the information processing apparatus 16 repeats steps S10 to S14 whenever the processor 68 receives a job from a mobile terminal 12 via a wireless AP 14. Accordingly, items of job reception data are accumulated in the actual reception speed DB 60.

In step S18, the processor 68 determines whether communication connection has been received from the mobile terminal of interest 12a. The communication connection mentioned here is communication connection before a job is transmitted from the mobile terminal of interest 12a to the information processing apparatus 16, communication connection through short-range wireless communication between the mobile terminal of interest 12a and the information processing apparatus 16, or communication connection via a wireless AP 14 randomly selected by the user. On receipt of communication connection from the mobile terminal of interest 12a, the process proceeds to step S20.

In step S20, the table generating unit 72 generates the actual reception speed table 62 on the basis of the actual reception speed DB 60. As the information processing apparatus 16 receives jobs from the mobile terminals 12 via the wireless APs 14 from time to time, and, as a result, the number of items of job reception data accumulated and stored in the actual reception speed DB 60 increases from moment to moment, in the exemplary embodiment, in order to make the content of the actual reception speed table 62 correspond to the content of the latest actual reception speed DB 60, the table generating unit 72 generates the actual reception speed table 62 after receiving communication connection from the mobile terminal of interest 12a. However, the table generating unit 72 may alternatively generate the actual reception speed table 62 before receiving communication connection from the mobile terminal of interest 12a.

In step S22, the reporting unit 74 reports the actual reception speed table 62 generated in step S20 to the user who uses the mobile terminal of interest 12a.

Although the exemplary embodiment of the present disclosure has been described above, the present disclosure is not limited to the above-described exemplary embodiment, and various changes may be made without departing from the spirit of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   receive a processing request from a mobile terminal of a user via any of a plurality of wireless access points;
   determine and store an actual reception speed of the processing request transmitted from the mobile terminal to the information processing apparatus via a current wireless access point among the plurality of wireless access points and identification information of the current wireless access point via which the mobile terminal has transmitted the processing request, associatively in an actual reception speed database that stores terminal information indicating communication performance of each mobile terminal model number;

on the basis of the actual reception speed database, calculate a representative actual reception speed which is a representative value of one or more actual reception speeds for each wireless access point of the plurality of wireless access points according to a model number of the mobile terminal and the actual reception speed for the current wireless access point; and report the representative actual reception speed of the each wireless access point the mobile terminal.

2. The information processing apparatus according to claim 1, wherein the processor is configured to transmit the representative actual reception speed of the each wireless access point to a mobile terminal of interest through short-range wireless communication between the mobile terminal of interest and the information processing apparatus, the mobile terminal of interest being the mobile terminal used by the user.

3. The information processing apparatus according to claim 1, wherein:

the processor is configured to:

in a case where transmission of the processing request from the mobile terminal to the information processing apparatus via the current wireless access point fails, store transmission failure information indicating the transmission failure and identification information of the current wireless access point associatively in the actual reception speed database;

calculate a total number of transmission failures of processing requests for the each wireless access point based on the actual reception speed database; and report to the user the total number of transmission failures of processing request regarding the each wireless access point.

4. The information processing apparatus according to claim 1, wherein:

the processor is configured to:

further accumulate and store the model number of the mobile terminal associatively with the actual reception speed and the identification information of the current wireless access point in the actual reception speed database; and calculate the representative actual reception speed by taking into consideration communication performance of a plurality of mobile terminals associated with each actual reception speed stored in the actual reception speed database, which is obtained based on terminal information indicating communication performance of each mobile terminal model number.

5. The information processing apparatus according to claim 1, wherein:

the processor is configured to:

further accumulate and store the model number of the mobile terminal associatively with the actual reception speed and the identification information of the current wireless access point in the actual reception speed database; and report to the user the representative actual reception speed of one or more actual reception speeds associated with a model number of a mobile terminal of interest used by the user in the actual reception speed database.

6. The information processing apparatus according to claim 1, wherein:

wireless communication is performed between the mobile terminal and the current wireless access point through mobile phone communication, and the processor is configured to report to the user the representative actual reception speed of one or more actual reception speeds of a wireless access point capable of performing mobile phone communication using a same carrier as a communication carrier used by a mobile terminal of interest used by the user for performing mobile phone communication, based on communication carrier information indicating a communication carrier providing the mobile phone communication for each of the wireless access points.

7. A non-transitory computer readable medium storing a program causing a computer of an apparatus to execute a process, the process comprising:

receiving a processing request from a mobile terminal of a user via any of a plurality of wireless access points;

determining and storing an actual reception speed of the processing request transmitted from the mobile terminal to the information processing apparatus via a current wireless access point among the plurality of wireless access points and identification information of the current wireless access point via which the mobile terminal has transmitted the processing request, associatively in an actual reception speed database that stores terminal information indicating communication performance of each mobile terminal model number;

on the basis of the actual reception speed database, calculating a representative actual reception speed which is a representative value of one or more actual reception speeds for each wireless access point of the plurality of wireless access points according to a model number of the mobile terminal and the actual reception speed for the current wireless access point; and reporting the representative actual reception speed of the each wireless access point to the mobile terminal.

8. An information processing method comprising:

receiving a processing request from a mobile terminal of a user via any of a plurality of wireless access points;

determining and storing an actual reception speed of the processing request transmitted from the mobile terminal to the information processing apparatus via a current wireless access point among the plurality of wireless access points and identification information of the current wireless access point via which the mobile terminal has transmitted the processing request, associatively in an actual reception speed database that stores terminal information indicating communication performance of each mobile terminal model number;

on the basis of the actual reception speed database, calculating a representative actual reception speed which is a representative value of one or more actual reception speeds for each wireless access point of the plurality of wireless access points according to a model number of the mobile terminal and the actual reception speed for the current wireless access point; and reporting the representative actual reception speed of the each wireless access point to the mobile terminal.

* * * * *